(12) United States Patent
Ochoa

(10) Patent No.: US 9,573,427 B2
(45) Date of Patent: Feb. 21, 2017

(54) TIRE MACHINE MOUNT AND DEMOUNT HEAD AND CLAMP FOOT ADAPTER

(71) Applicant: Sandy Ochoa, Alamogordo, NM (US)

(72) Inventor: Sandy Ochoa, Alamogordo, NM (US)

( * ) Notice: Subject to any disclaimer, the term of this patent is extended or adjusted under 35 U.S.C. 154(b) by 539 days.

(21) Appl. No.: 14/146,921

(22) Filed: Jan. 3, 2014

(65) Prior Publication Data

US 2015/0191059 A1    Jul. 9, 2015

(51) Int. Cl.
  *B60C 25/135*  (2006.01)
  *B60C 25/132*  (2006.01)
  *B60C 25/05*  (2006.01)

(52) U.S. Cl.
  CPC ......... *B60C 25/132* (2013.01); *B60C 25/0569* (2013.04); *B60C 25/0572* (2013.04); *B60C 25/0581* (2013.04); *B60C 25/0539* (2013.04)

(58) Field of Classification Search
  CPC ............... B60C 25/132; B60C 25/0581; B60C 25/0569; B60C 25/0572
  See application file for complete search history.

(56) References Cited

U.S. PATENT DOCUMENTS

| | | | | |
|---|---|---|---|---|
| 2,653,653 A * | 9/1953 | Weaver | ............... | B60C 25/132 157/1.24 |
| 3,791,434 A * | 2/1974 | Duquesne | ............... | B60B 30/06 157/1.24 |
| 3,815,653 A * | 6/1974 | Scott | ............... | B60C 25/132 157/1.24 |
| 3,858,637 A * | 1/1975 | Duquesne | ............... | B60C 25/135 157/1.24 |
| 4,210,190 A * | 7/1980 | Hessels | ............... | B60B 30/06 157/1.24 |
| 5,941,294 A * | 8/1999 | Cunningham | ............... | B60C 25/132 157/1.2 |
| 5,971,052 A * | 10/1999 | Kliskey | ............... | B60C 25/02 157/1 |
| 6,629,554 B2 * | 10/2003 | Mimura | ............... | B60C 25/0578 157/1.17 |
| 7,267,155 B2 * | 9/2007 | Brahler, II | ............... | B60C 25/02 157/1.17 |

* cited by examiner

*Primary Examiner* — Bryan R Muller
(74) *Attorney, Agent, or Firm* — Dennis F. Armijo

(57) ABSTRACT

A mount and demount head configured as a housing affixed to a shaft of an OEM tire machine with a semicircular shaped shaft affixed to the housing. The shaft has a bulbous protrusion on a bottom end of the shaft with specific tapers. The shaft and the bulbous end have a flattened portion for following the contour of the rim. On the upper side of the bulbous end is the narrow semicircular shaft with a tapered top end, tapered to a widened shaft, which is affixed to the housing. A non-metallic insert is preferably inserted into a void in the flattened portion of the narrow semicircular shaft and bulbous end to protect the rim surface. Clamp adapters are used to clamp and hold small wheel assemblies whereby the clamp adapters are inserted over the OEM clamps to extend the clamp capability of the OEM tire machine.

13 Claims, 8 Drawing Sheets

TIRE MACHINE MOUNT AND DEMOUNT HEAD AND CLAMP FOOT ADAPTER

RELATED APPLICATION

This application claims the benefit of U.S. Provisional Application No. 61/749,441, filed Jan. 7, 2012, the specification of which is incorporated herein by reference.

BACKGROUND OF THE INVENTION

Field of the Invention (Technical Field)

The presently claimed invention relates to tire tools and more particularly to a mount and demount head for tire machines, and a clamp foot adapter for accommodating different sized wheel assemblies.

Background Art

Presently, there are few options for tire machine heads for mounting and demounting tires from rims. These include a "duck head" type tool; however, these tools are sized for particular configurations of wheel assemblies and different sizes of tires and rims. Secondly, these types of heads work on a different principle by having a lip that follows the contour of the rim while in operation. This type of head does not work on smaller wheel assemblies, such as ATV or wheelbarrow wheels. In addition, these types of heads tend to stretch the tire bead causing scars and tears to the bead and damage to the tire rim.

In addition, there is no type of tire machine that can accommodate smaller wheel assemblies as discussed above. The clamp feet on prior art tire changers are designed specifically for certain types of wheel assemblies, such as passenger car assemblies or truck assemblies and are not adaptable to the smaller sized rim assemblies.

SUMMARY OF THE INVENTION (DISCLOSURE OF THE INVENTION)

The presently claimed invention solves the aforementioned shortcomings of the prior art by providing a mount and demount head that operates on a very different principle by avoiding the "duck head" and not having the head strictly follow the contour of the rim flange. The mount and demount head in the claimed invention is configured as a housing with a shaft having a semicircular shape affixed to a side of the housing. The housing is configured to attach to a tire machine in whatever attachment system is used by the tire machine manufacturer. The shaft has a bulbous end on a bottom end of the shaft with specific tapers on each side of the bulbous end. The shaft and the bulbous end have a flattened portion for following the contour of the rim. On the upper side of the bulbous end is the narrow semicircular shaft with a tapered top end, tapered to a widened shaft that is affixed to the housing, as described above. A non-metallic insert is preferably inserted into a void in the flattened portion of the narrow semicircular shaft and bulbous end to protect the rim surface.

For demounting a tire, the bulbous end is inserted between the first tire bead and the rim and a demounting bar is also inserted. The tire machine is activated and the first tire bead is peeled off the rim by the first tire bead being stretched over the rim by the semicircular shaft. The rim is protected by the non-metallic insert affixed to the flatted portion of the semicircular shaft and bulbous end if the demounting operation pulls the semicircular shaft towards the rim. The operation is repeated for the second tire bead.

The mounting operation is performed in a similar fashion. The bulbous end is inserted between the rim and the first bead. A mounting bar is also inserted to hold the bead on the underside of the rim. The tire machine is activated and the first tire bead is stretched over the rim lip and into the inside of the rim. The operation is repeated for the second bead.

Clamp feet adapters are also disclosed herein. These adapters are manually placed over the existing clamp feet to extend the reach of the existing clamp feet, for either outside or inside clamping systems. The adapters are U shaped members configured to fit snugly over the existing clamp feet. The adapters have a stop on a first end that abuts against the existing rim clamp notch, and an adapter rim clamp affixed to the adapter at a second end. The adapter rim clamp is configured to catch the rim edge within a notch in the adapter rim clamp. The adapter is configured to provide for a predetermined distance between the stop and the adapter rim clamp; the predetermined distance being the difference between the wheel assembly configuration of the Original Equipment Manufacturer (OEM) tire machine and the size of the wheel assembly to be mounted or demounted.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
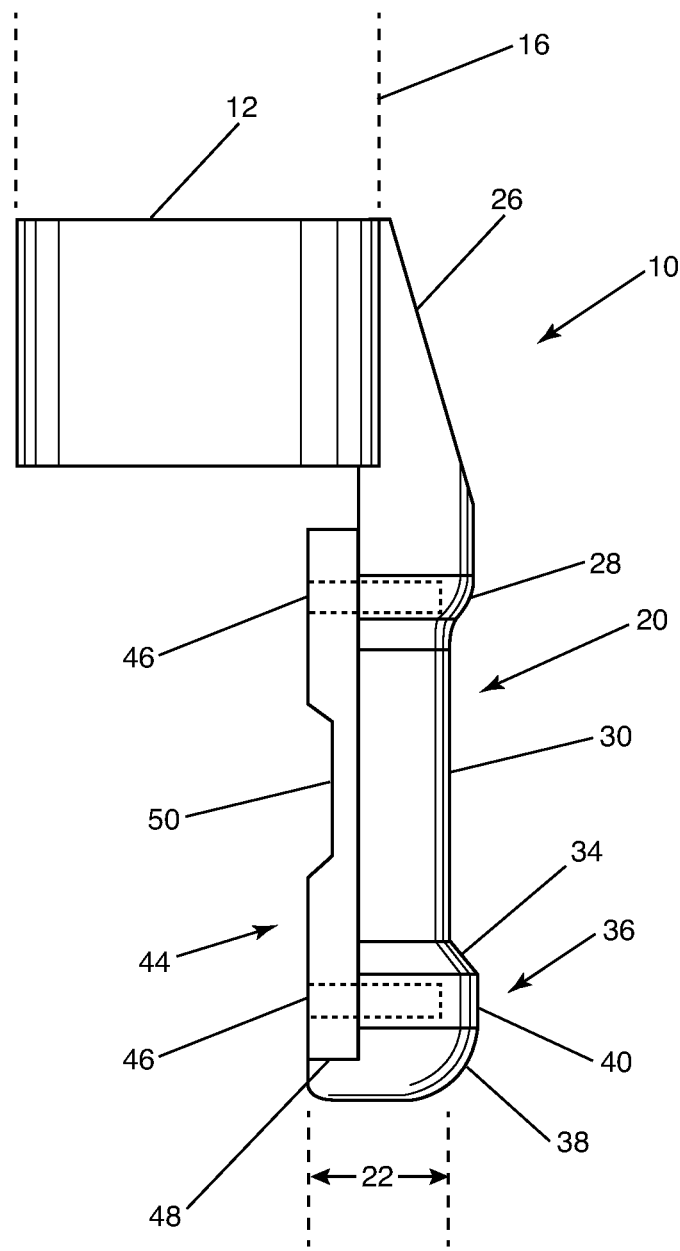
FIG. 1 is a side view of the preferred mount and demount head.
Figure 2:
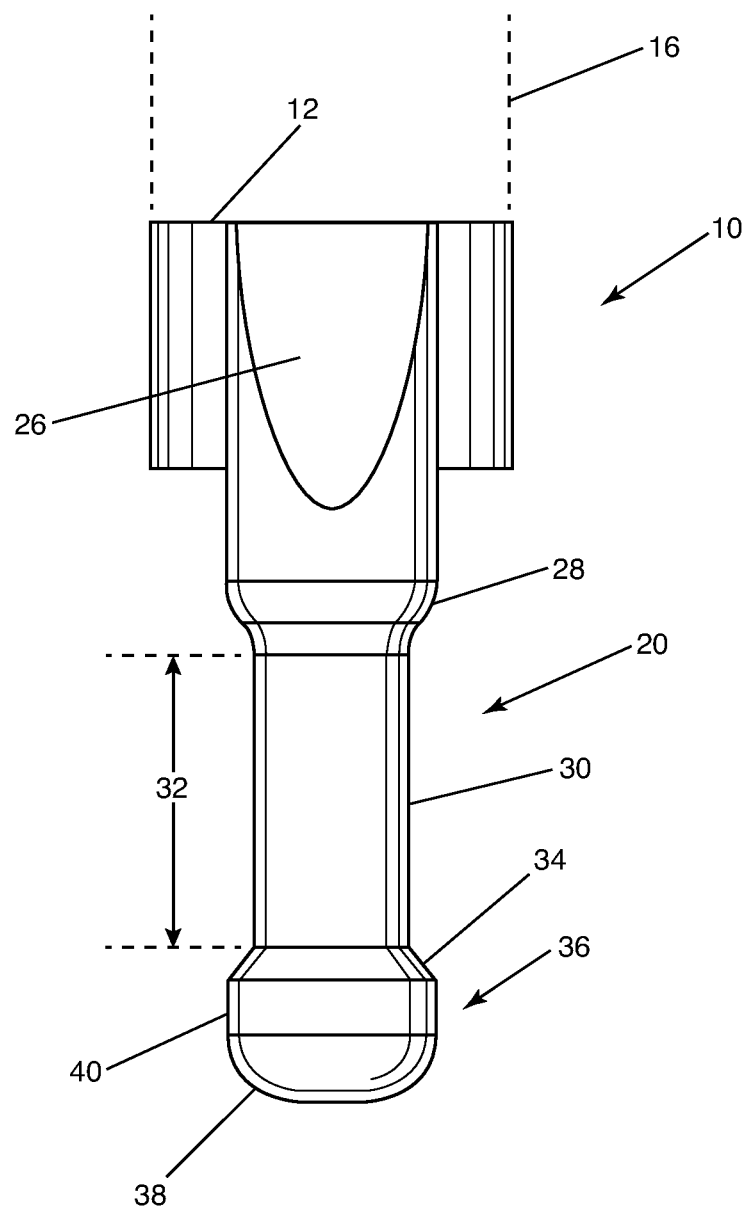
FIG. 2 is a front view of the embodiment of FIG. 1.
Figure 3:
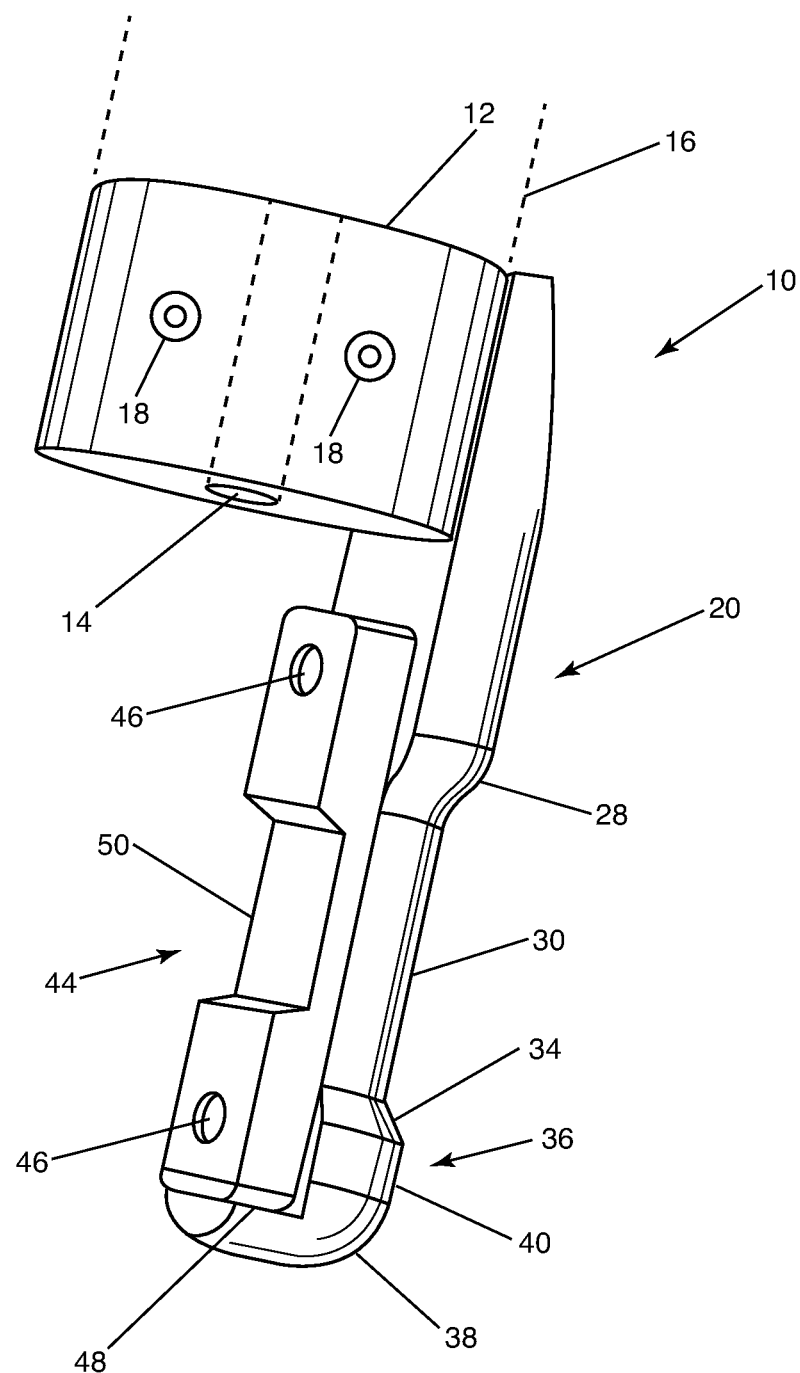
FIG. 3 is a perspective view of the preferred mount and demount head.

DESCRIPTION OF THE PREFERRED EMBODIMENTS (BEST MODES FOR CARRYING OUT THE INVENTION)

The presently claimed mounting and demounting head attachment 10 is custom built for the brand of tire machine that is being used. The preferred mount and demount head is shows in FIGS. 1, 2, 3, and 5 which show different views of this embodiment. This is a one-time changing head since it will work on all sizes of tires, and is designed to work on, but not limited to, four (4) inch through large truck tires, which is a significant difference from the prior art heads which are designed to be used on a single sized wheel assembly.

As shown in FIGS. 1, 2, 3, and 5, mounting and demounting head 10 preferably comprises housing 12 that is configured for attaching to an OEM tire machine shaft 16. In the shown embodiments, the attachment design is an aperture 14 for inserting a bolt or other like (not shown) to secure mounting and demounting head 10 to tire machine shaft 16. Housing 12 is preferably custom bored so that aperture 14 fits in the corresponding tire machine shaft 16 and so that an outside diameter of housing 12 corresponds to the outside diameter of tire machine shaft to avoid hang-ups by the tire during the mounting or demounting operation. Housing 12 can be a collar with setscrew portals 18 for adjusting the pitch of semicircular shaft 20 to correspond to the radius of the wheel 24. Semicircular shaft 20 is preferably constructed from a resilient material such as hardened steel to prevent breakage, yet narrow in width 22 to prevent stretching of the tire bead.

Semicircular shaft 20 has a tapered portion 26 for affixing to housing 12. This can be accomplished by welding or other attachment means well known in the art. Tapered portion 26 is provided to prevent hang-ups by the tire bead during a mounting or demounting operation. First transition 28 comprises a radius reduction for tapered portion 26 to reduced shaft 30. First transition 28 is used to keep the tire bead within reduced shaft 30 during mounting and demounting operations. Length of reduced shaft 32 is a predetermined dimension to allow the tire bead to "float" up and down during mounting and demounting operations as discussed below, more fully. Second transition 34 comprises a radius increase from reduced shaft 30 to bulbous end 36. Bulbous end 36 has a center portion 40 and a bottom portion or base 38. Base 38 is rounded as shown to prevent hang-ups and also to push on a tire bead as explained below.

Semicircular shaft 20 has a flattened portion 42 that extends on an inside section from tapered portion 26 to bulbous end 36 and sits on shelf 48. Flattened portion 42 is the part of mounting and demounting head 10 that is the closest part of the tool to the rim and follows the contour of the rim during mounting and demounting operations. Rim protector 44 can be affixed to flattened portion 42 to protect the rim in the event mounting and demounting tool 10 contacts the rim surface. Rim protector 44 can be affixed with threaded bolts (not shown) into rim protector apertures 46 in first transition 28 and second transition 34. Rim protector 44 can have an indented portion 50 to aim and maintain the rim edge during mounting and demounting operations. Rim protector 44 is constructed from any type of material, such as plastic, that prevents scarring of the rim surface during contact.

The unique design of the mount and demount head works on smaller tires because of the sleek and thin design, and is preferable for all sizes of tires, unlike prior art heads, since it does not stretch the bead as much as the prior art devices.

Figure 4:
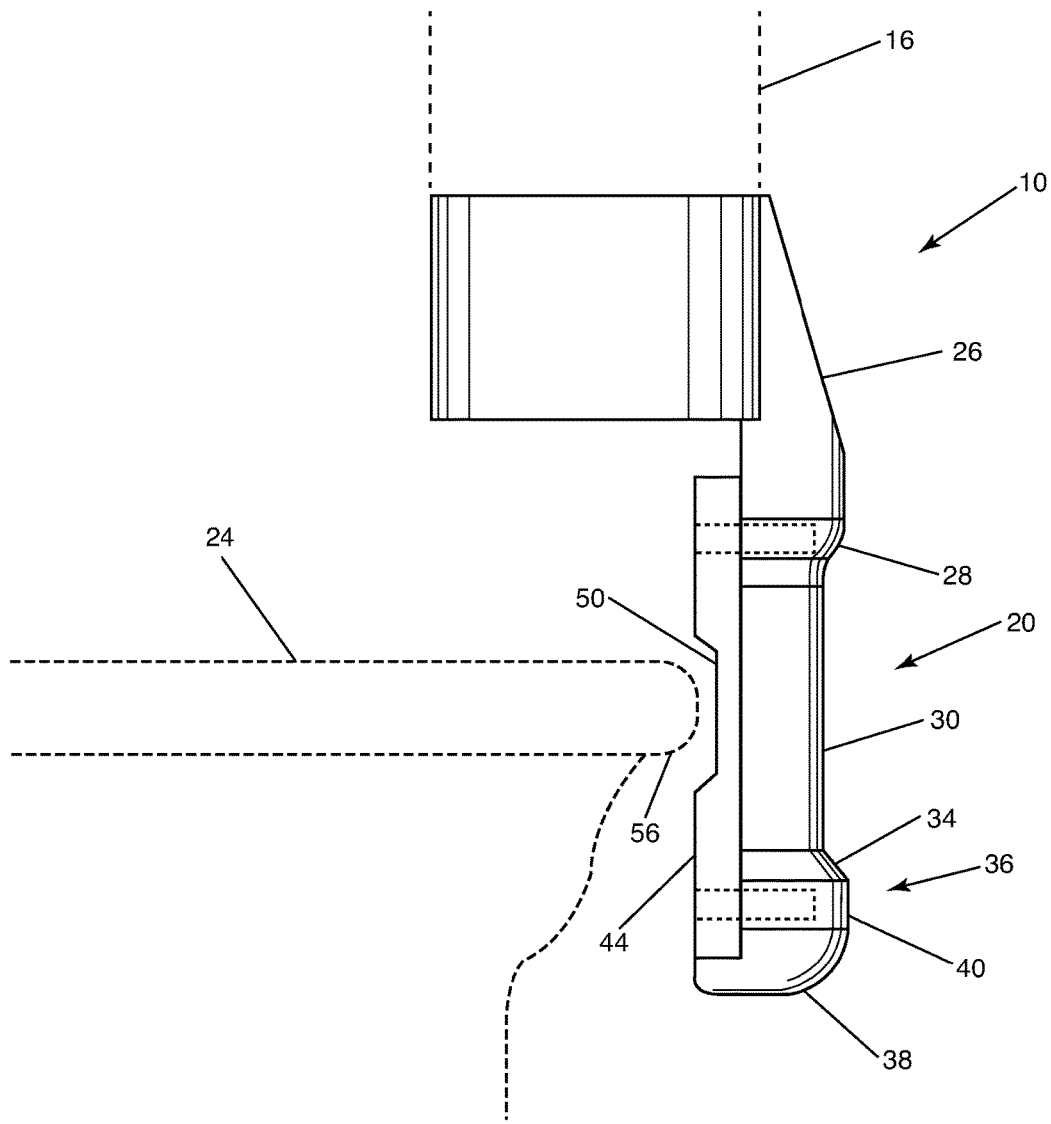
FIG. 4 is a preferred mount and demounting position of the mount and demount head.
Figure 5:
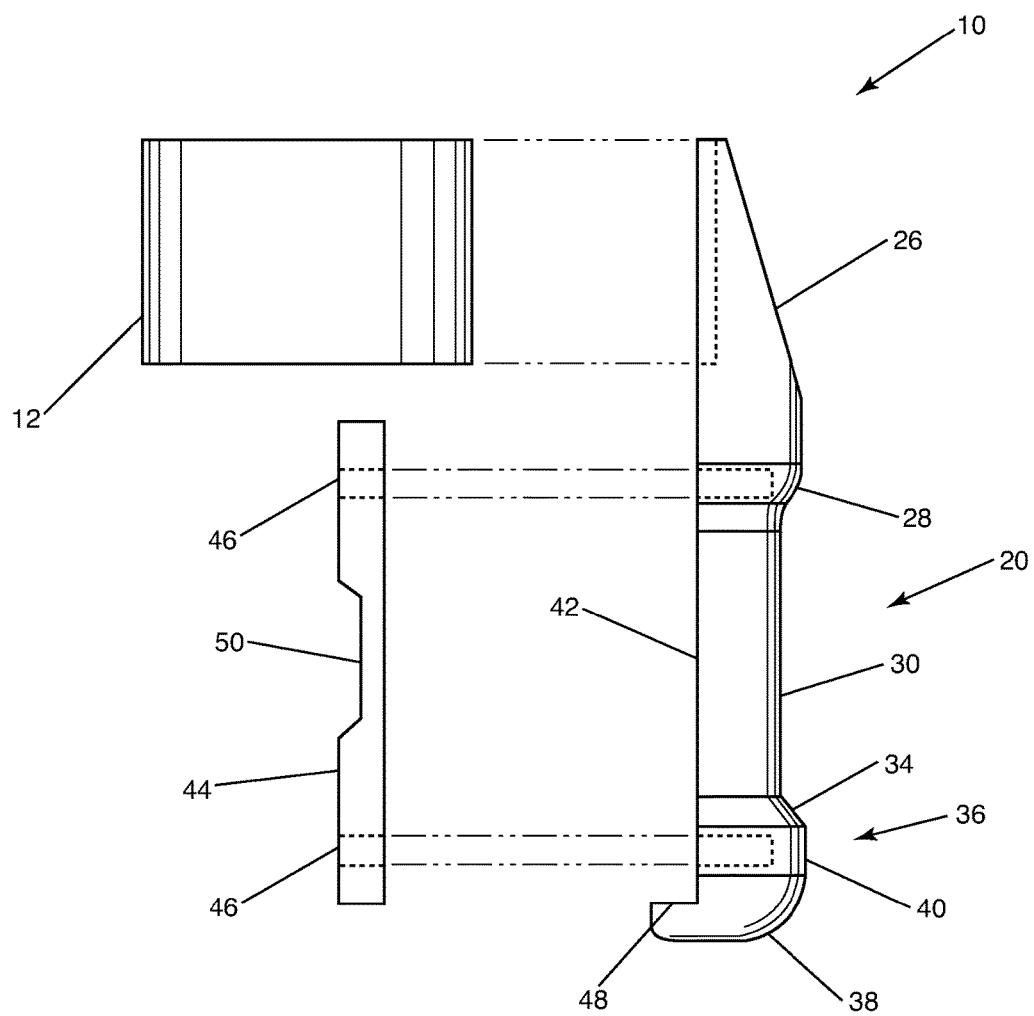
FIG. 5 is an isolated view of individual components comprising the mount and demount head.
Figure 6:
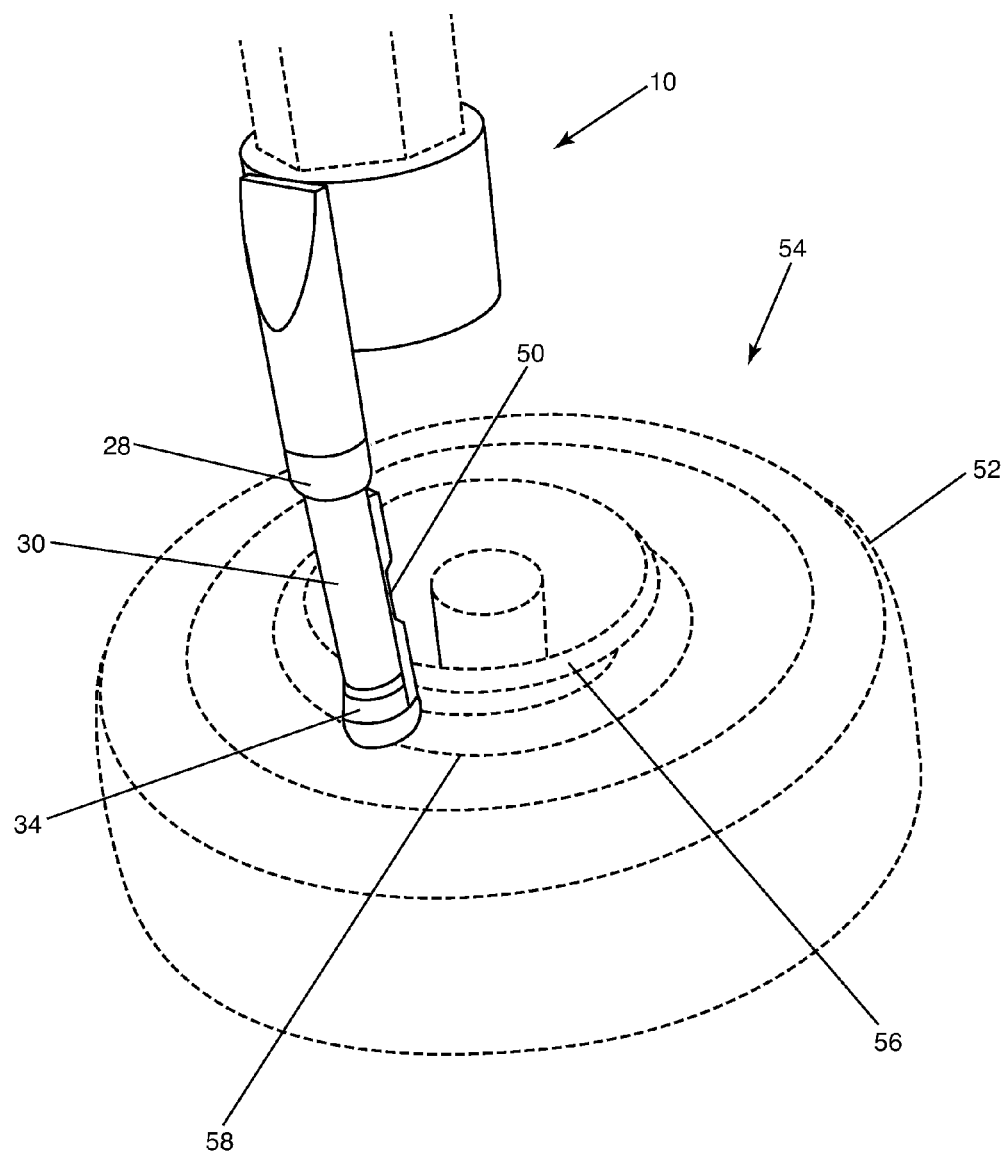
FIG. 6 is a perspective view of a demounting operation.
Figure 7A:
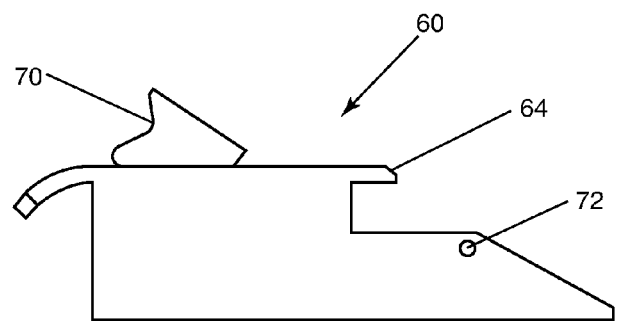
FIG. 7A is a side view of the preferred clamp foot adapter.
Figure 7B:
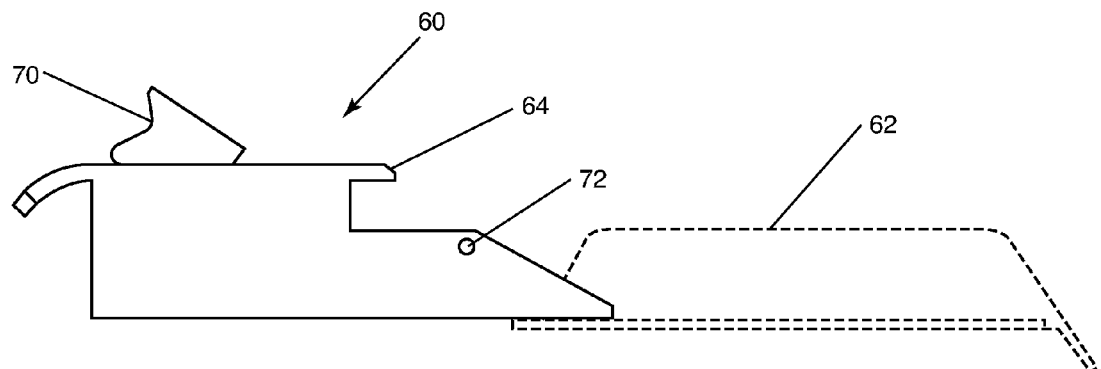
FIG. 7B is a side view of the preferred clamp foot adapter next to an OEM clamp.
Figure 7C:
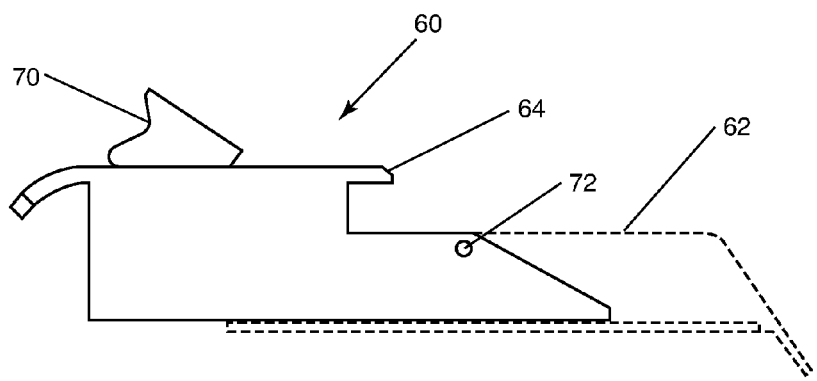
FIG. 7C is a side view of the preferred clamp foot adapter inserted over an OEM clamp.

FIGS. 4 and 6 show the preferred system and method for mounting and demounting a tire with the new mounting and demounting head. The claimed invention is described in the steps of operation below.

All systems require that the air be deflated from the tire and the wheel weights removed. All systems require also generous lubrication around the entire circumference of the tire. Failure to do so may result in a damaged bead. Place wheel assembly 54 on the tire machine evenly between the sleeves (not shown) and initiate the clamping mechanism. Place mount and demount head 10 next to rim 56 centered on reduced shaft 30, preferably within indented portion 50 of rim protector 44. This is the preferred position for both mounting and demounting. Allow a small distance such as ⅛" to 3/16" from the reduced shaft 30 and the wheel or rim 56. Within reduced shaft 30 is rim protector 44, preferably constructed from a hard plastic that faces the wheel edge or rim 56, which helps when there is pressure from mounting and demounting that can cause the reduced shaft 30 pull in closer to rim 56, thus preventing damage to the rim. For difficult tire mounting or demounting, the first transition 28 and second transition 34 in mount and demount head 10 can ease the operation. First transition 28 is designed to keep tire bead 58 within reduced shaft in mounting operations while second transition is designed to keep tire bead 58 within reduced shaft in demounting operations.

For mounting or demounting a tire, mount and demount head 10 is aligned with rim 24 as shown in FIG. 4. This allows the bead to be easily stripped from rim 24 as the wheel assembly is rotated for demounting a tire. For mounting tires 10 is aligned with rim 24 as shown in FIG. 4. The indented portion of the plastic protector 50 is aligned to 56. This properly sets 10 as shown in FIG. 4. Proper distance from wheel 24 prevents damage to wheel 56, unnecessary stretching of the tire bead 58, and minimizes strain on the tire machine. Using standard mounting and demounting bars help the tire up over the bulbous end 36 and rotate tire 52 and wheel 56 until it has completely demounted first bead 58, as shown in FIG. 6. Use the mounting and demounting bar to lift second bead over bulbous end 36 and rotate tire 52 until the tire is removed from rim 56. Tapered portion 26 allows upper tire bead to glide up (demounting) or down (mounting) between points 28 and 16. This is of value in particular when tire has a wide wheelbase.

The unique design allows for mounting of tubeless tires or tires with tubes. The design and method of mounting makes it easier to avoid pinching or otherwise damaging the tube. To mount first bead 58, adjust tire 52 to where reduced shaft 30 second transition 34 is pressing on the edge of bead 58 and rotate tire 52 and wheel 56 until it is fully mounted. This is the method and system used for all sizes of tires and first transition assists the placement of bead 58 over the rim flange 56. To mount the second bead on tire 52, the same process is used as described above. For small tires, bottom portion 38 can be used to press the top of the bead for mounting. This procedure can be performed to mount small tire without the use of a mounting bar. While squeezing the tire 52 firmly and holding it stationary, 38 presses on the top of the bead 58, while the machine rotates tire 52 and wheel 56. The operator can move the reduced shaft 30 up to make it easier for the bottom portion 38 to glide upon each bead of the tire when using this method to mount. When mounting a larger tire, the preferred method is to keep the center of reduced shaft 30 even with the rim flange 56, as shown in FIG. 4.

Also shown in this disclosure are clamp feet adapters 60. As shown in FIGS. 7A, 7B, 7C, and 8. Typical tire machines are designed to fit standard automobile and light truck tires so the clamping mechanisms cannot clamp onto smaller wheel assemblies. By using clamp adapters 60, a typical tire machine can be used to clamp and hold wheel assemblies as small as four-inch (4") wheels. Each clamp foot adapter 60 slides over the OEM clamp 62. Clamp adapter is configured to fit over OEM clamp and a stop hook 64 engages OEM clamp hook 66, as shown. When the clamping mechanism is engaged, OEM clamp hook 66 pushes against stop hook 66, thus forcing clamp adapter to squeeze against rim edge 68. A raised adapter hook 70 is affixed to each clamp adapter 60 that is configured to hook onto rim edge 68 upon engagement of the clamping mechanism. Upon retraction of the clamping mechanism, reverse stop 72 engages OEM clamp 62, which retracts clamp adapter 60 and disengages adapter hook 70 from rim edge 68. These clamp adapters allow the OEM clamping mechanisms to clamp and hold smaller wheel assemblies simply by inserting them over the OEM clamps and require no bolting or significant assembly.

Figure 8:
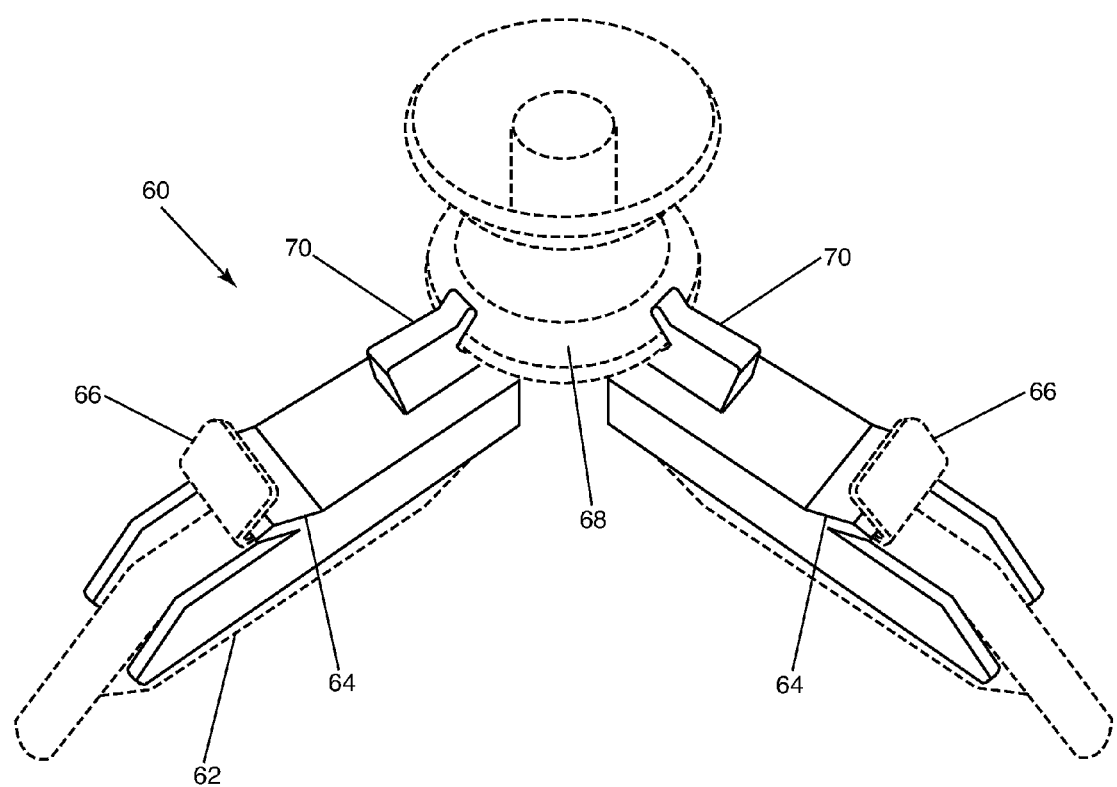
FIG. 8 is a perspective view of the operation of the clamp foot adapters holding a small rim.

The method and system for using the clamp adapter for mounting or demounting is similar to the description above with the addition of the following procedure. If handling a smaller tire, such as a four-inch (4") through ten-inch (10") wheel assembly, clamp adapters 60 are inserted over each OEM clamp 62 onto the rim of the tires, as shown in FIG. 8. Clamp adapter 60 is slid over the existing OEM foot clamp 62 until stop hook 64 is abutted against the existing rim clamp notch or hook 66. This step is repeated for each foot clamp. This is a unique and removable step down system that will allow an existing tire machine to mount and demount smaller tires. This system is removable when working on anything larger than a ten-inch (10") wheel assembly.

Although the claimed invention has been described in detail with particular reference to these preferred embodiments, other embodiments can achieve the same results. Variations and modifications of the presently claimed invention will be obvious to those skilled in the art and it is intended to cover in all such modifications and equivalents. The entire disclosures of all references, applications, patents, and publications cited above, are hereby incorporated by reference.

What is claimed is:

1. A dual-purpose single mount and demount head for a tire machine comprising:
    a housing for affixing to a tire machine shaft; and
    the dual-purpose single mount and demount head affixed to the housing, the dual-purpose single mount and demount head comprising:
    a semicircular longitudinal cross-sectional structure with a flattened side on a first side;
    a first semicircular transition to maintain a tire bead onto the dual-purpose single mount and demount head for mounting a tire;
    a second semicircular transition to maintain the tire bead onto the dual-purpose single mount and demount head for demounting the tire, wherein the first and second transitions partially encircle the dual-purpose single mount and demount head and are disposed on a second side, wherein the first side and the second side are opposite relative to a longitudinal axis of the dual-purpose single mount and demount head such that the first and second transitions are longitudinally aligned with and opposed to the flattened side;
    a reduced shaft between the first and second transition having a smaller radial dimension than the first and second transitions; and
    a bulbous end.

2. The dual-purpose single mount and demount head of claim 1 further comprising a rim protector affixed to the flattened side.

3. The dual-purpose single mount and demount head of claim 2 wherein the rim protector further comprises a rim guide.

4. The dual-purpose single mount and demount head of claim 1 further comprising the housing having more than one portal for adjusting a pitch of the mount demount head.

5. The dual-purpose single mount and demount head of claim 1 wherein the mount and demount head further comprises a tapered portion for affixing to the housing.

6. A method for mounting a tire on a rim, the method comprising the steps of:
    a) providing a housing for affixing to a tire machine shaft and a dual-purpose single mount and demount head affixed to the housing, the dual-purpose single mount and demount head comprising a semicircular longitudinal cross-sectional structure with a flattened side on a first side, a first semicircular transition to maintain a tire bead onto the dual-purpose single mount and demount head for mounting a tire, a second semicircular transition to maintain the tire bead onto the dual-purpose single mount and demount head for demounting the tire, wherein the first and second transitions partially encircle the dual-purpose single mount and demount head and are disposed on a second side, wherein the first side and the second side are opposite relative to a longitudinal axis of the dual-purpose single mount and demount head such that the first and second transitions are longitudinally aligned with and opposed to the flattened side, a reduced shaft between the first and second transition having a smaller radial dimension than the first and second transitions, and a bulbous end;
    b) inserting the bulbous end between a tire bead and the rim;
    c) aligning the semicircular structure flattened side of the reduced shaft with a rim edge;
    d) inserting a tire tool between the tire bead and the rim;
    e) rotating the tire to pull the bead over the rim edge and insert the tire bead inside the rim; and
    f) repeating steps b) through e) for mounting a second bead.

7. The method of claim 6 further comprising the step of allowing the tire bead to float along the reduced shaft.

8. The method of claim 6 further comprising the step of preventing the tire bead from traversing the reduced shaft by the first transition.

9. The method of claim 6 further comprising the step of preventing a hang up of the tire bead on the mount and demount shaft by a tapered portion for affixing the mount and demount shaft to the housing.

10. A method for demounting a tire on a rim, the method comprising the steps of:
    a) providing a housing for affixing to a tire machine shaft and a dual-purpose single mount and demount head affixed to the housing, the dual-purpose single mount and demount head comprising a semicircular longitudinal cross-sectional structure with a flattened side on a first side, a first semicircular transition to maintain a tire bead onto the dual-purpose single mount and demount head for mounting a tire, a second semicircular transition to maintain the tire bead onto the dual-purpose single mount and demount head for demounting the tire, wherein the first and second transitions partially encircle the dual-purpose single mount and demount head and are disposed on a second side, wherein the first side and the second side are opposite relative to a longitudinal axis of the dual-purpose single mount and demount head such that the first and second transitions are longitudinally aligned with and opposed to the flattened side, a reduced shaft between the first and second transition having a smaller radial dimension than the first and second transitions, and a bulbous end;
    b) inserting the bulbous end beneath the tire bead and a lip of the rim;
    c) lifting the tire bead over the bulbous end;
    d) aligning the semicircular structure flattened side of the reduced shaft with a rim edge;
    e) inserting a tire tool between the tire bead and the rim;
    f) rotating the tire to peel the tire bead over the rim edge; and g) repeating steps b) through f) for demounting a second bead.

11. The method of claim 10 further comprising the step of allowing the tire bead to float along the reduced shaft.

12. The method of claim 10 further comprising the step of preventing the tire bead from traversing the reduced shaft by the second transition.

13. The method of claim 10 further comprising the step of preventing a hang up of the tire bead on the mount and demount shaft by a tapered portion for affixing the mount and demount shaft to the housing.

* * * * *